United States Patent [19]

Harley

[11] Patent Number: 4,923,163

[45] Date of Patent: May 8, 1990

[54] FIXING DEVICE

[75] Inventor: David N. Harley, Dorset, United Kingdom

[73] Assignee: Titus Tool Company Limited, Buckinghamshire, England

[21] Appl. No.: 192,713

[22] Filed: May 11, 1988

[51] Int. Cl.$^5$ .............................................. A47F 5/00
[52] U.S. Cl. ..................................... 248/300; 24/458; 24/573; 52/DIG. 6; 52/285; 52/784; 312/140; 312/263; 403/187; 403/405.1; 411/15; 411/85
[58] Field of Search ................... 411/85, 84, 15, 55, 411/61; 312/140, 263; 403/405.1, 187; 52/DIG. 6, 784, 285; 24/573, 456, 458, 461, 462, 532; 248/300

[56] References Cited

U.S. PATENT DOCUMENTS

| | | | |
|---|---|---|---|
| 2,883,228 | 4/1959 | Roberts, Jr. | 52/285 X |
| 2,891,752 | 6/1959 | Genter | 248/231.91 X |
| 3,088,560 | 5/1963 | Preuss | 52/285 |
| 3,858,370 | 1/1975 | Halstead | 403/405.1 X |
| 4,444,372 | 4/1984 | Klingstedt | 411/15 X |
| 4,601,247 | 7/1986 | Welch et al. | 24/573 X |
| 4,693,630 | 9/1987 | Giovannetti | 403/405.1 |

FOREIGN PATENT DOCUMENTS

| | | | |
|---|---|---|---|
| 3500321 | 10/1986 | Fed. Rep. of Germany | 403/405.1 |
| 2508120 | 12/1982 | France | 403/405 |
| 2518192 | 6/1983 | France | 403/405 |
| 701524 | 2/1966 | Italy | 411/61 |

Primary Examiner—David L. Talbott
Attorney, Agent, or Firm—Lowe, Price, LeBlanc, Becker & Shur

[57] ABSTRACT

A fixing device 30 is provided for securing two members, one of which is formed with a groove, together in a predetermined angular relationship. The device includes two limbs 32,34 having respective free ends 36,46 located at the same end 49 of the device, the limbs being arranged to act as levers which, when pushed towards each other at a predetermined position, cause the free ends 36,46 to move apart to engage walls of the groove. The device 30 also advantageously includes a necked slot 50 for receiving, for example, a screw, for securement to the one planar surface, which necked slot cooperates with the screw such that the screw will push the limbs together in order to effect said engagement as the screw secures the device to the ungrooved member.

20 Claims, 3 Drawing Sheets

FIG. 3b
FIG. 3a
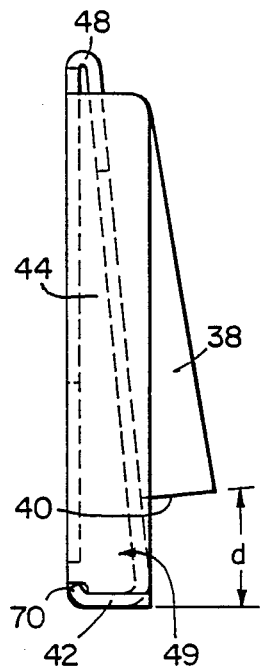
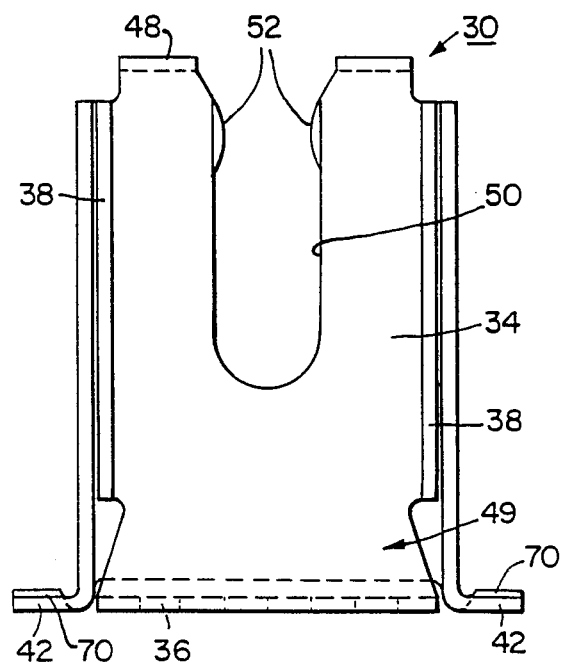
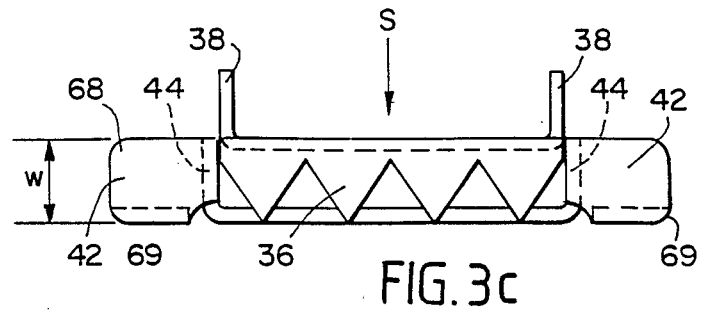
FIG. 3c

FIXING DEVICE

FIELD OF THE INVENTION

The invention relates to a fixing device for use in, for example, securing two members to each other in a predetermined angular relationship.

BACKGROUND OF THE RELEVANT ART

In cabinet making and the like it is often necessary to secure one panel perpendicularly to another during construction of the cabinet and this can be satisfactorily achieved using any one of a number of well known methods and apparatus. The choice of method and apparatus is often limited by the material being used in the panels. For example, if the material is a wood, established methods of nail and glue, or even the more elaborate methods of tongue and groove or dovetailing, will provide a joint between two panels that will last for the lifetime of the cabinet.

If the panels are made of, for example, chipboard or medium density fibreboard (MDF) established methods such as tongue and groove and dovetailing can be used only in certain circumstances and with a limited degree of success. Accordingly, a wide range of fixing devices are available to facilitate the construction of chipboard cabinets, and an example of such a device is shown in FIG. 1. Known devices of this type are commonly made from a plastics material injection moulded into the desired form which comprises a main body 10 in which screw receiving holes 12, 14, 16 are formed. Screws 18, 20 and 22 are screwed to respective walls 24, 26 and thus the cabinet may be built. Chipboard used in cabinets is normally covered in a material such as, for example, melamine, in order to provide an aesthetically pleasing finish to the board. When screws are to penetrate this material it is advantageous to pre-drill pilot or screw-receiving holes through the coating into the board in order to provide guidance for the screws, ease insertion and reduce the possibility of the board splitting as the screw is inserted. Where the board is an MDF board it is particularly important that pilot holes are drilled since MDF tends to split and delaminate otherwise. The pilot holes should ideally be full pilot holes, i.e., holes which penetrate the board at least to the depth that the screw will penetrate on insertion and which have a diameter substantially that of the minor diameter of the screw, i.e., the screw diameter less the depth of the thread.

This method of drilling full pilot holes to receive screws for fixing two panels, be they chipboard or MDF, is satisfactory in most circumstances for most jobs. However, MDF is a material which can easily be formed into strips having on at least one side a complex non-planar contour and because of this it is popularly used to provide finishing trims on cabinets and the like in, for example, a kitchen, where it is supplied in lengths of typically up to 3 meters long and is fitted along the top and bottom of a continuous rum of wall units. A problem with these trims is that the portion which will received the screw is commonly narrow in comparison with other portions, e.g., edge portions of the trim. Accordingly, it is not easy to fit the trim because of the likelihood of damage or at least weakening as the pilot hole is drilled in the narrow portion of the trim. Furthermore, because of the length of the trim, it is necessary to position such pilot holes with a high degree of accuracy since any errors in drilling are likely to be amplified along the length of the trim. Trims are usually cut ot size and drilled with pilot holes immediately prior to being fitted to the kitchen units and, as such, on-site conditions are often far from ideal for accurate drilling which further aggravates the problem.

SUMMARY OF THE DISCLOSURE

It is therefore an object of the present invention to provide a fixing device which overcomes the above-mentioned problems.

One aspect of the invention provides a device for use in securing two members to each other in a predetermined angular relationship, one of which members is provided with a groove, the device comprising two limbs having respective free ends which are located at the same end of the device, which limbs are arranged to act as levers which, when pushed towards each other at a predetermined position, cause their free ends to move apart to engage the walls of the groove, the device being adapted to co-operate at said position with securing means of a type which will push the limbs together when used to secure the device to the other member.

Another aspect of the invention provides a fixing device for use in securing one member to another member in a predetermined relationship, the fixing device having an insert portion insertable into a groove on the one member and being arranged such that, in securing the device to the other member, the insert portion expands outwards so that it bites into edge portions of the said groove thereby to secure the two members in said relationship.

Further features of the invention are set forth with particularity in the appended claims in order that the invention may be well understood, and an exemplary embodiment thereof will be described with reference to the accompanying drawings in which:

BRIEF DESCRIPTION OF THE DRAWING

FIGS. 3(a)–3(c) are, respectively, a plan view, a side view and an end view of the fixing device;

DESCRIPTION OF THE PREFERRED EMBODIMENT

Figure 1:
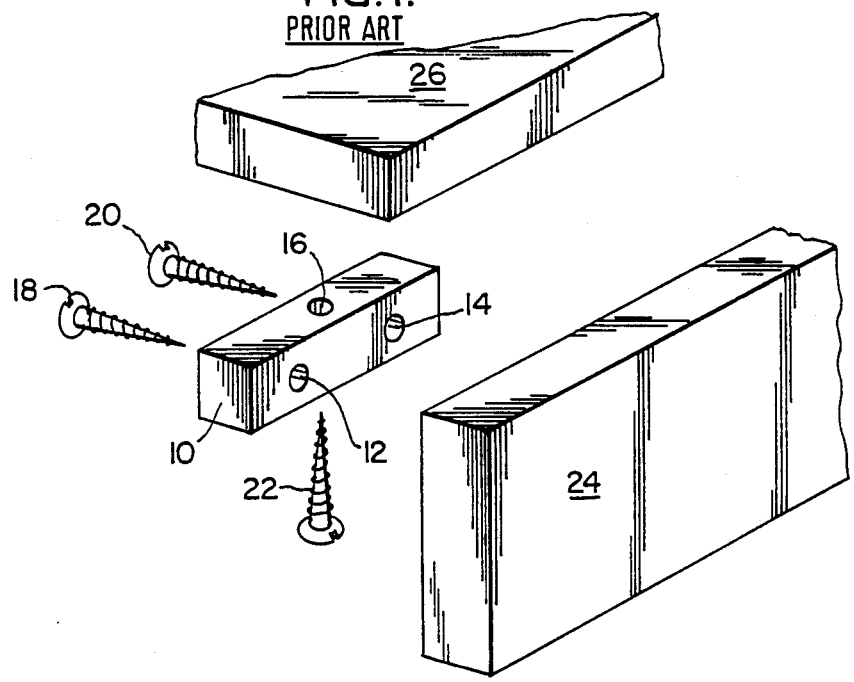
FIG. 1 is a perspective view of a typical prior art fixing device to illustrate how it can be used to secure two panels to each other.
Figure 2:
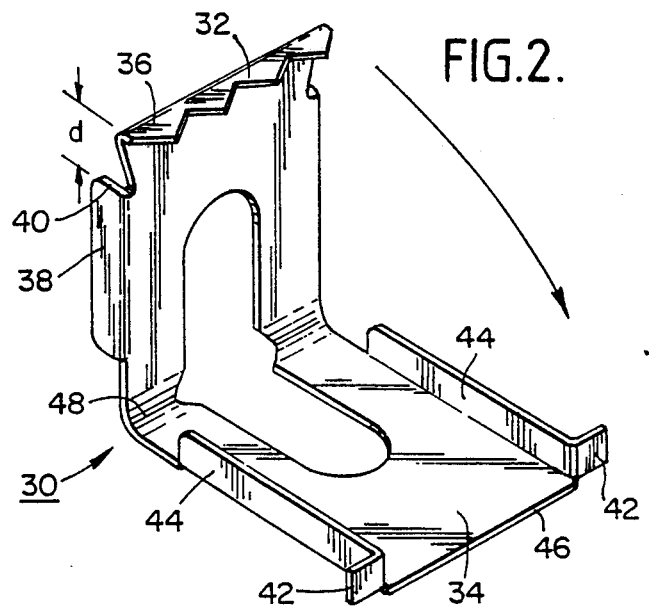
FIG. 2 is a perspective view of a fixing device in accordance with the invention with upper and lower limbs spaced apart for the purpose of illustration.

Referring now to FIGS. 2 and 3(a)–3(c), a fixing device generally indicated at 30 comprises an upper limb 32 and a lower limb 34. It will be appreciated that the terms upper and lower are intended to be merely terms of reference and are in no way intended to be limiting. The upper limb 32 includes a toothed end portion 36 and a pair of support flanges 38 on either side of the limb and spaced from the toothed portion 36 by a predetermined distance "d" to provide an end stop 40, the purpose of which will become clearer from the description hereinafter. The lower limb 34 includes a pair of wings 42 which extend from end portions of flanges 44 substantially running along the lengthof the edge of the lower limb and substantially perpendicular to the open end 46 of the lower limb. In the example, the upper limb 32 and lower limb 34 are formed integrally, preferably from a resilient material such as tempered steel and in a single pressing operation, and are joined by a hinge portion 48. The upper and lower limbs are brought together by bending the device about the hinge portion 48 so that the toothed end portion 36 of the upper limb 32 and the end 46 of the lower limb 34 normally rest in the position shown in FIGS. 3(a)–3(c) to form an insert portion 49 of width w and depth d.

As can be best seen in FIG. 3(a) a portion of the rear of the fixing device 30 is cut away to form a necked slot 50, so called because of projections 52 on both sides thereof which serve to constrict the slot 50 towards the rear of the device 30. In use, the necked slot 50 receives a screw from the direction shown by arrow S in FIG. 3(c) in order to secure the device 30 to a panel forming part of a cabinet, and the projections 52 serve to limit movement of the device 30 relative to the screw during subsequent fitting operations.

Examplary use of the device will now be explained with reference particularly to FIGS. 4 and 5 of the drawings. The device 30 can be used to secure two members to each other in any predetermined angular relation but its preferred use, as shown in FIG. 4, is to secure a trim member 60 to a lower exterior wall or upper exterior wall 62 of a cabinet (not shown).

Figure 4:
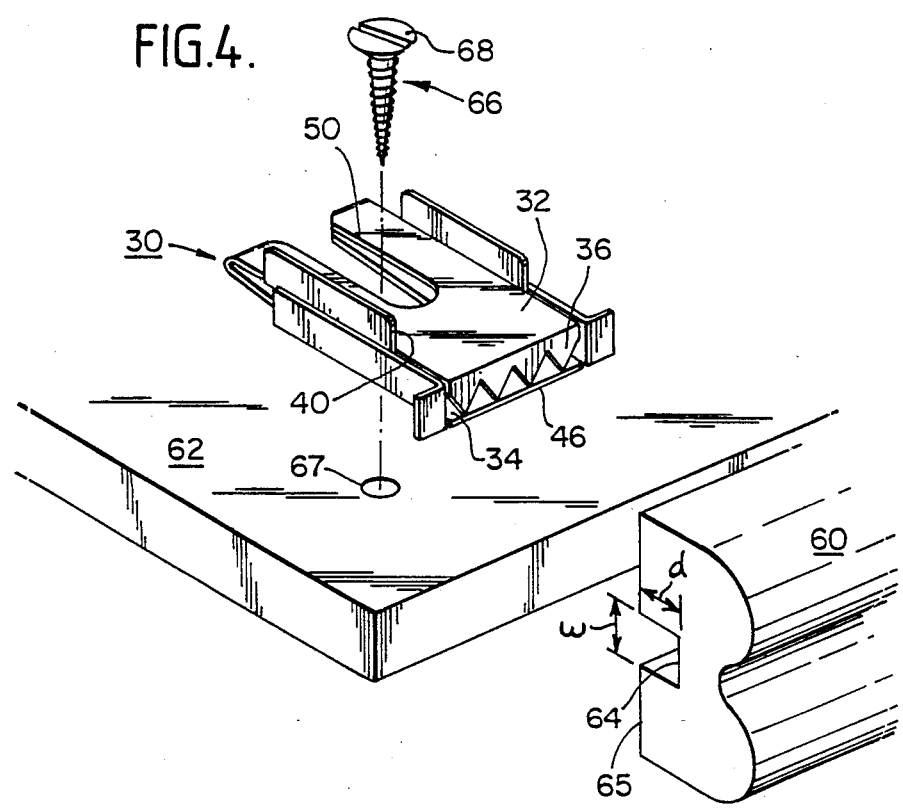
FIG. 4 is an exploded view of a use for the fixing device.
Figure 5:
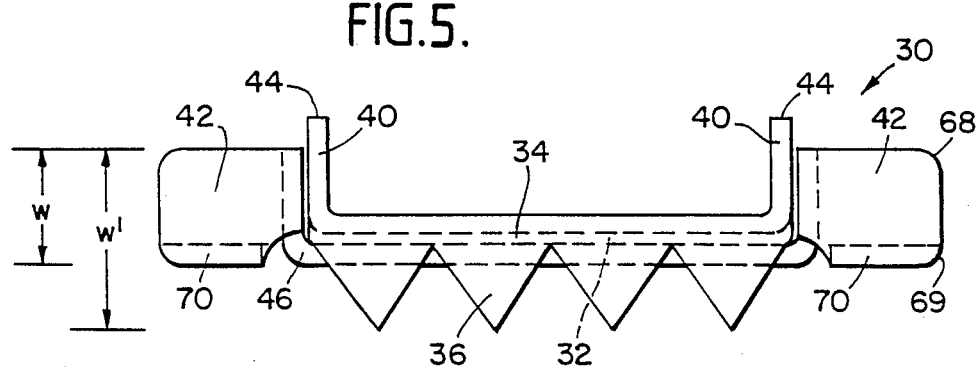
FIG. 5 shows the device in a compressed fixing position.

The trim member has a preformed groove 64 cut into one surface 65 thereof and having substantially a depth "d" and a width "w" corresponding to the same above-identified dimensions as the device 30 as best seen in FIG. 4, which groove 64 therefore preferably receives fully the insert portion 49 (see FIG. 3(a)). With the groove 64 so dimensioned, the stop 40 will contact the surface 65 of the trim member 60 to prevent further insertion of the device 30 and to provide support to the trim member 10 in order to maintain a predetermined, e.g., perpendicular, angular relationship between the trim member 60 and the wall 62. A screw 66 is passed through the necked slot 50 to secure the device 30 to the wall 62 which may include a pilot hole 67 to facilitate entry of the screw 66.

The provision of a slot of groove 64 in the trim member facilitates fitting of the trim member to the wall since the device 30 can be moved along the slot of groove 64 after insertion in order for it to be positioned correctly prior to the screw 66 being screwed into the wall 62. The ability of the device 30 to tolerate positional inaccuracies is further enhanced by the necked slot 50 which allows longitudinal movement of the screw 66 within the necked slot 50 relative to the device whilst preventing the device from falling away from the initially loose screw, unless more than a minimum force is applied to the device which minimum force will result in the projections 52 being forced past the screw 66.

As the screw 66 is screwed into the cabinet wall 62, the screw head 68 acts against the upper limb 32 to urge it towards the lower limb 34. This causes the toothed end portion 36 to move down past the end 46 of the lower limb, thereby increasing the initial width "w" of the insert portion 49 to a greater width "w'", as best understood with reference to FIG. 5. Since the insert portion 49 will have been inserted into the groove of width "w" prior to the screw being tightened, the resulting increase in width of the insert, from "w" to "w'", portion 49 will cause the teeth to bite into a corresponding edge of the groove 64, thereby securing the device 30 to the trim member 60 and the wall 62.

Of course, as an alternative to the above, it is possible to screw the screw 66 in only partially into the wall 62 before fitting the device 30 into the groove in the trim member 60 since the projections 52 in the necked slot 50 can be dimensioned to allow a suitably sized screw to be pushed past the constriction between projections 52 on application of sufficient force by the user.

In order to facilitate insertion of the insert portion 49 into the groove 64, the wings 42 are preferably of substantially the same width "w" as the rest of the insert portion 49 since this will prevent the teeth 36 from catching in side walls of the groove 64 during insertion. The wings 42 may advantageously have rounded corners, e.g., corners 68 and 69, and may include a swept back edge portion 70, as can be best seen in FIG. 3 in order to further enhance insertability of the insert portions.

An embodiment of the invention having thus been described, it will be obvious to those posessed of the relevant skills that many modifications are possible. For example, the upper and lower limbs of the device need not be integrally formed but can instead be provided as separate members which are brought together to form the whole. Indeed, since the purpose of the hinge portion 48 is merely to act as a fulcrum point about which the limbs can pivot, the provision of a hinge is not necessary to the working of the invention so long as a fulcrum point is provided and the device is arranged so that in fixing the device, for example, wall 62, the free ends of the limbs will move apart to bite into groove 64 in trim member 60.

Moreover, whilst the described arrangement is intended for use in fixing two members perpendicularly to each other, the device can readily be modified to accomodate different angular relationships simply by forming the insert portion at the required angle α from the main body of the device, as best seen in FIG. 3(b), and by modifying the angle of the end stop accordingly. In addition, it may be appropriate under certain circumstances to replace the necked slot with a screw receiving hole, and such a modification is also intended to be within the ambit of the invention.

Furthermore, it is not critical to the working of the invention that the depth of the groove be at least equal to the corresponding distance "d" to the end stop 40 on the device, since the device will provide adequate support between the two members to which it is affixed whether or not the end stop 40 contacts the surface 65 of the grooved panel.

I claim:

1. A device for use in securing two members to each other in a predetermined angular relationship, one of the members being provided with a groove, the device being adapted to be secured to the other member by a securing means, the device comprising:

two limbs, having respective free ends which are located at the same end of the device, said limbs being arranged to coact as levers which, when forcibly moved toward each other at a predetermined position, cause their free ends to move apart to engage two walls of the groove of the grooved member, the device being adapted to cooperate at said predetermined position with said securing means for forcing the limbs together when said securing means is used to secure the device to said other member.

2. A device according to claim 1, wherein:

at least one of said free ends includes a planar end portion which engages with an edge portion of the groove in use.

3. A device according to claim 2, wherein:
the other free end includes wing members lying in substantially the same plane as said planar portion and extending away therefrom to facilitate insertion of an insert portion of the device in said groove.

4. A device according to claim 3, wherein:
the wing members each includes a swept back edge portion.

5. A device according to claim 4, wherein: the two limbs define an aperture through which a screw can be passed in order to secure the device to one of the members in use.

6. A device according to claim 5, wherein: the aperture comprises a slot portion.

7. A device according to claim 5, wherein: the slot portion includes constricting projections for limiting lateral movement of the device in relation to the screw during securement of the device to the one member.

8. A fixing bracket according to claim 7, wherein: the two limbs are connected by a hinge portion.

9. A device according to claim 8, wherein: the end portion is provided with a toothed edge.

10. A device for use in securing a first member to a second member in a predetermined relationship, the fixing device comprising:
a body having an insert portion and a screw-receiving aperture extending therethrough, said insert portion being insertable into a groove provided in the first member, said aperture facilitating securing of the device to the second member by the insertion of a screw therethrough into the second member, said device being arranged such that in securing the device to the second member the insert portion expands outwardly in a direction substantially parallel to the insertion of the screw so that said insert portion formed to comprise sharp end portions for biting into edge portions of the groove, thereby secures the two members in said predetermined relationship.

11. A device according to claim 10, wherein: the insert portion comprises an end projection on a first limb and a complementary end projection on a second limb, the first and second limbs forming the main body of the device.

12. A device according to claim 11, wherein:
the first and second limbs are held substantially parallel and spaced apart by a hinge portion.

13. A device according to claim 12, wherein:
said first and second limbs define said screw receiving aperture.

14. A device according to claim 13, wherein:
said limbs are arranged to move towards each other during securement of the device to the second member under influence of the screw thereby causing said insert portion to expand outwards.

15. A device according to claim 14, wherein:
the end projection on the first limb comprises a toothed end portion which extends towards the end of the second limb, and the end projection on the second limb comprises wing members which extend outwardly from corner portions of the second limb.

16. A device according to claim 15, wherein:
a depth stop is provided to define the insert portion, thereby limiting insertion of the insert portion in the groove and providing support to the first member in use.

17. A device according to claim 16, wherein:
the insert portion and the depth stop are adapted to hold the first and second members in a substantially perpendicular relationship with respect to each other during use.

18. A device according to claim 17, wherein:
said first and second limbs are formed as a single integral structure.

19. A device for use in securing two members to each other in a predetermined angular relationship, one of which members is provided with a groove, the device comprising:
two limbs having respective free ends which are located at the same end of the device, said limbs being arranged to coact as levers which, when forcibly moved towards each other at a predetermined position, cause their free ends to move apart to engae two walls of the groove; and
securing means for securing the device to the other member, the device being adapted to cooperate at said predetermined position with said securing means for forcing the limbs together.

20. A device for use in securing a first member to a second member in a predetermined relationship, the fixing device comprising:
an insert portion insertable into a groove on the first member; and
means for securing the device to the second member such that, in securing of the device to the second member the insert portion expands outwardly of the device so that it bites into edge portions of the groove to thereby secure the two members in said predetermined relationship.

* * * * *